United States Patent

Haitko et al.

[11] Patent Number: 5,575,926
[45] Date of Patent: Nov. 19, 1996

[54] DECHLORINATION OF CHLORINATED HYDROCARBONS BY SOLUBLE IRON CITRATE

[75] Inventors: Deborah A. Haitko; Gerald R. Eykholt, both of Schenectady, N.Y.

[73] Assignee: General Electric Company, Schenectady, N.Y.

[21] Appl. No.: 218,396

[22] Filed: Mar. 28, 1994

[51] Int. Cl.$^6$ ........................................... C02F 1/70
[52] U.S. Cl. .................. 210/757; 210/908; 210/909; 588/206
[58] Field of Search ..................... 210/757, 758, 210/908, 909; 588/206, 207

[56] References Cited

U.S. PATENT DOCUMENTS

| | | | |
|---|---|---|---|
| 4,382,865 | 5/1983 | Sweeny | 210/743 |
| 4,416,767 | 11/1983 | Jordan | 208/262 |
| 4,758,346 | 7/1988 | Johnson | 210/638 |
| 5,051,030 | 9/1991 | Saha et al. | 405/128 |
| 5,093,011 | 3/1992 | Friedman et al. | 210/757 |
| 5,096,600 | 3/1992 | Hoch | 210/751 |
| 5,273,657 | 12/1993 | Nakashima et al. | 210/640 |

FOREIGN PATENT DOCUMENTS

| | | |
|---|---|---|
| 0454642A1 | 10/1991 | European Pat. Off. . |
| 3912820C2 | 10/1990 | Germany . |
| 53-55475 | 5/1978 | Japan . |
| 2238533 | 6/1991 | United Kingdom . |
| WO92/07797 | 5/1992 | WIPO . |

*Primary Examiner*—Neil McCarthy
*Attorney, Agent, or Firm*—James Magee, Jr.

[57] ABSTRACT

A method for significantly improving the dechlorination of chlorinated hydrocarbon compounds is disclosed. The method involves admixing preformed ferrous citrate with chlorinated hydrocarbon contaminated aqueous compositions both in situ and ex situ. The use of ferrous citrate decreases the oxidation potential of the $Fe^{+2}/Fe^{+3}$ redox couple to cause oxidation by the chlorinated hydrocarbon with its concomitant reduction, thereby generating chloride ion.

5 Claims, No Drawings

5,575,926

DECHLORINATION OF CHLORINATED HYDROCARBONS BY SOLUBLE IRON CITRATE

FIELD OF THE INVENTION

The present invention relates to a method for dechlorination of aqueous solutions contaminated with chlorinated hydrocarbons. More specifically, it relates to dechlorination of trichloroethylene using soluble ferrous species, specifically ferrous citrate.

BACKGROUND OF THE INVENTION

Pollution of water by chlorinated hydrocarbons has become an important environmental problem and contaminated groundwaters represent a large portion of environmental remedial action plans throughout the world.

Dechlorination of trichloroethylene by elemental iron to generate reaction products such as ethylene, ethane, and chloride ion is known. The ability of iron to dechlorinate trichloroethylene offers a method for in situ treatment of groundwater. Additionally, the use of iron affords little environmental threat. Thus, it is desirable to be able to efficiently dechlorinate groundwater contaminates in situ using iron.

It is known that batch reactions using elemental iron typically require twenty to twenty-five grams of iron metal per hundred milliliters of aqueous sample containing twenty-five parts per million trichloroethylene. Half-lives for such reactions under buffered conditions range from five to twenty hours dependent upon the pH, type or source of elemental iron, surface area of iron, etc.

A commonly owned, copending application, titled "Enhanced Remediation of Aqueous Compositions Contaminated with Halogenated Hydrocarbons," discloses a method which reductively reacts chlorinated hydrocarbons with metallic iron in the presence of citric acid to generate innocuous byproducts. It is disclosed that lower amounts of iron, in the order of two grams per twenty-five parts per million trichloroethylene in a hundred milliliter sample, are required for the dechlorination of trichloroethylene in the presence of as little as one weight percent of citric acid based upon the weight of iron. By adding citric acid to the reaction solution, the rate of the dechlorination reaction is substantially increased, while the amount of iron needed to completely dechlorinate the hydrocarbons is reduced.

It was recently discovered that a homogeneous reaction can take place in solution between a preformed ferrous citrate complex, Fe (II) citrate, and trichloroethylene to generate chloride ion and rapid degradation of trichloroethylene to innocuous products. The ferrous citrate complex increases the efficiency of the dechlorination of hydrocarbons in aqueous solutions by significantly decreasing the amount of iron needed in the reaction.

Thus, it is an object of this invention to disclose a method to degrade chlorinated hydrocarbons in an aqueous media using a soluble iron (II) species.

It is a further object of this invention to use ferrous citrate to lower the oxidation potential of the Fe(II)/Fe(III) couple to allow favorable oxidation by trichloroethylene.

SUMMARY OF THE INVENTION

The method of this invention pertains to the dechlorination of aqueous compositions contaminated with chlorinated hydrocarbons comprising admixing said aqueous compositions with an effective amount of ferrous citrate thereby generating innocuous reaction products. By adding ferrous citrate to contaminated solutions a seventeen-fold decrease in the amount of iron required is demonstrated.

An effective amount of ferrous citrate, as used herein, means an amount which is sufficient to materially substantially increase the rate of dechlorination of chlorinated hydrocarbon compounds in solution. Ferrous citrate as a reactive species significantly lowers the oxidation potential of the $Fe^{+2}/Fe^{+3}$ couple so that $Fe^{+2}$ complexed to citrate can effectively dechlorinate the chlorinated hydrocarbons. The chlorinated hydrocarbons are generally polychlorinated hydrocarbons such as trichloroethylene, tetrachloroethylene, tetrachloroethane, and the like.

The invention can be practiced in different settings. For instance, in one embodiment the method of this invention can be practiced in situ without the removal of the contaminated water from the ground, pond, or stream. Contaminants in groundwater can be degraded in place because the reaction products are environmentally acceptable and need not be removed.

In another embodiment, this invention may be practiced by batch processing, where the contaminated aqueous solution is treated in a separate container by admixing the ferrous citrate with the contaminated solution. The method can also be performed in a gas absorption column.

Accordingly, this invention provides a process for significantly improving the dechlorination of chlorinated hydrocarbons in contaminated aqueous solutions utilizing ferrous citrate, and said method can be practiced both in situ and ex situ.

DESCRIPTION OF THE INVENTION

A system has been discovered to treat aqueous compositions contaminated with chlorinated hydrocarbons that degrades chlorinated hydrocarbons with preformed ferrous citrate thereby forming nontoxic products.

It is disclosed that the amount of iron needed in the dechlorination reaction can be significantly decreased by utilizing preformed ferrous citrate as a reaction substrate in solution with chlorinated hydrocarbons.

For example, it has been shown that two grams of metallic iron, $Fe^0$, per twenty-five parts per million trichloroethylene in a hundred milliliter aqueous solution, is required for the dechlorination of trichloroethylene in the presence of as little as one weight percent of citric acid based upon the weight of iron. In the reaction, 0.0358 moles of metallic iron is needed per 0.057 millimoles of carbon-chlorine bonds.

In contrast, when ferrous citrate is used in the same aqueous trichloroethylene containing solution as in the aforementioned example, 0.25 grams of ferrous citrate is required. The ferrous citrate driven reaction needed 1.01 millimoles of iron as iron (II), $Fe^{+2}$, per 0.028 millimoles of carbon-chlorine bonds reduced.

Thus, use of iron (II) as the citrate complex increases the efficiency of dechlorination of trichloroethylene versus the metallic iron, $Fe^0$, reaction by a factor of seventeen. This is because complexation of iron (II) by citrate lowers the oxidation potential sufficiently to cause oxidation by trichloroethylene with its concomitant reduction generating chloride ion. As a result, significantly less iron is needed to reductively dechlorinate trichloroethylene.

Additionally, it has been found that high levels of the free iron (II) species exists in solutions over a wide pH range, between a pH of about two to ten, in comparison to iron (III). This is caused by the higher stability of iron (II) and stability of the ferrous citrate complex. The reduction potentials for the Fe(III)/Fe(II) couple as a function of pH are presented in Table 1.

TABLE 1

Reduction Potential for Conversion of Fe(III) Citrate to Fe(II) Citrate Based on pH.

| pH | Net Reaction Potential Fe(III) to Fe(II) | Log of Molar Concentration | | | |
|---|---|---|---|---|---|
| | | $Fe^{+2}$ | $Fe^{+2}Cit$ | $Fe^{+3}$ | $Fe^{+3}Cit$ |
| 2.0 | 0.577 eV | 0.00 | −4.18 | −3.29 | 0.00 |
| 2.4 | 0.506 eV | 0.00 | −3.03 | −4.49 | −0.01 |
| 2.8 | 0.436 eV | −0.01 | −1.94 | −5.69 | −0.01 |
| 3.2 | 0.367 eV | −0.04 | −1.01 | −6.89 | −0.01 |
| 3.6 | 0.306 eV | −0.21 | −0.42 | −8.09 | −0.02 |
| 4.0 | 0.252 eV | −0.49 | −0.17 | −9.29 | −0.05 |
| 4.4 | 0.200 eV | −0.81 | −0.07 | −10.49 | −0.13 |
| 4.8 | 0.146 eV | −1.09 | −0.04 | −11.69 | −0.37 |
| 5.2 | 0.087 eV | −1.30 | −0.02 | −12.89 | −0.94 |
| 5.6 | 0.024 eV | −1.43 | −0.02 | −14.09 | −1.83 |
| 6.0 | −0.043 eV | −1.50 | −0.01 | −15.29 | −2.89 |
| 6.4 | −0.112 eV | −1.53 | −0.01 | −16.49 | −4.03 |
| 6.8 | −0.182 eV | −1.54 | −0.01 | −17.69 | −5.21 |
| 7.2 | −0.208 eV | −2.30 | −0.07 | −18.89 | −6.40 |
| 7.6 | −0.231 eV | −3.10 | −0.31 | −20.09 | −7.59 |
| 8.0 | −0.255 eV | −3.90 | −0.88 | −21.29 | −8.79 |
| 8.4 | −0.279 eV | −4.70 | −1.63 | −22.49 | −9.99 |
| 8.8 | −0.302 eV | −5.50 | −2.42 | −23.69 | −11.19 |
| 9.2 | −0.326 eV | −6.30 | −3.22 | −24.89 | −12.39 |
| 9.6 | −0.349 eV | −7.10 | −4.02 | −26.09 | −13.59 |

In the practice of this invention preformed ferrous citrate is admixed with the contaminated aqueous solution. U.S. Pat. No. 3,091,626 teaches a method for synthesizing ferrous citrate. Ferrous citrate for the present invention was made in the following manner. A 300 mL three necked round-bottomed flask was charged with 13.9 grams, 0.050 moles, of ferrous sulfate heptahydrate. 70 mL of deionized water, degassed by purging with nitrogen through a fritted stem, was added in order to solubilize the ferrous salt. This was accompanied by magnetic stirring. 15 grams, 0.0781 moles, of anhydrous citric acid was added to the solution. The pH of the solution was adjusted to within 2.6 to 2.9 by the addition of 30% ammonium hydroxide. The reaction vessel was then equipped with a nitrogen inlet and two stoppers, and affixed atop a condenser cooled with tap water. The reaction flask was immersed in a heated oil bath at a temperature of 130° C. to allow the reactant solution to reach reflux. Reflux was maintained for approximately one hour, after which time the oil bath is removed and the reaction is allowed to cool. The ferrous citrate precipitated from the reaction solution as a white powder. At room temperature, the reacted solution was filtered with the ferrous citrate being isolated on a medium porosity fritted funnel. The ferrous citrate was washed with copious quantities of water, then methanol, before drying in a 70° C. vacuum overnight. The isolated yield was approximately 7.5 grams or 60%. The yield can be increased if the resulting mother liquor is further concentrated. The ferrous citrate prepared above, showed 99% $Fe^{+2}$ as determined by Inductively-Coupled Plasma.

The following examples serve to demonstrate further the method of this invention.

EXAMPLE 1

General Procedures: Ferrous citrate was synthesized according to the above mentioned procedure. Gas chromatography was used by means of an electron capture detector operating at 300° C. and injector temperature of 200° C. A capillary JW Scientific DB-1 column (30 meters) was used with a temperature gradient program set at an initial oven temperature of 50° C. and held for 2 minutes after which time the temperature was ramped to 120° C. at a rate of 20° C. per minute and held for 5 minutes.

Dechlorination Experiment: In a typical reaction 0.25 grams of ferrous citrate (1.01 millimoles) are added to a 100 mL hypovial. Approximately 1.0 gram of commercially available sodium phosphate monobasic and potassium phosphate dibasic are added to the same hypovial to control the pH at 5.8 for 100 mL of aqueous solution. 100 mL of a 25 parts per million trichloroethylene aqueous solution are added to the vial and the vial immediately sealed with teflon coated septa and aluminum crimp caps. The hypovials containing all reagents are shaken through use of an Orbital Shaker set at 200 rpm. To ensure integrity of the trichloroethylene aqueous solutions, sampling is performed using a 5 mL gas tight syringe. The sample withdrawn is immersed in an equivolume amount of high purity hexane to extract the trichloroethylene from the aqueous phase prior to GC Electron Capture Detection analysis. Approximately 50% loss of trichloroethylene from the aqueous solution is seen within 10 minutes coupled with chloride ion production. Chloride ion determinations were made by ion chromatography and ion selective electrode.

EXAMPLE 2

The following represent examples of the reaction between soluble ferrous citrate and trichloroethylene at room temperature and starting with a trichloroethylene aqueous solution containing 43 ppm. These reactions were not controlled by buffering and in no way represent optimal conditions. In one reaction 0.25 grams of ferrous citrate (1.01 millimoles) are added to a 100 mL hypovial. 100 mL of a 38.4 ppm trichloroethylene aqueous solution are added to the vial and the vial immediately sealed with teflon coated septa and aluminum crimp caps. The hypovials containing all reagents are shaken through use of an Orbital Shaker set at 200 rpm. To ensure integrity of the trichloroethylene aqueous solutions, sampling is performed using a 5 mL gas tight syringe and the sample withdrawn is immersed in an equivolume amount of high purity hexane to extract the trichloroethylene from the aqueous phase prior to GC Electron Capture Detection analysis. These samples were not analyzed quickly as the reactions were run for gas chromatography coupled with mass spectroscopy in order to determine products in the gas above the solution. Approximately 50% loss of trichloroethylene from the aqueous solution was seen after 8 hours coupled with chloride ion production. The pH of the solution was 3.4. Chloride ion determinations were made by ion chromatography and ion selective electrode.

We claim:

1. A method for dechlorination of aqueous compositions contaminated with chlorinated hydrocarbon compounds consisting essentially of admixing the aqueous composition with an amount of ferrous citrate effective to lower the Fe(II)/Fe(III) oxidation potential relative to the standard Fe(II)/Fe(III) oxidation potential to cause reduction of trichloroethylene and generation of chloride ion in the aqueous compositions, said reduction occurring at a pH of from about 2.4 to 5.0 in an unbuffered solution or at a pH of from about 5 to about 6 in a buffered solution.

2. A method according to claim 1 wherein the chlorinated hydrocarbon compounds are polychlorinated hydrocarbons.

3. A method according to claim 2 wherein the polychlorinated hydrocarbons are trichloroethylene.

4. A method according to claim 1 wherein the contaminated aqueous composition is groundwater.

5. A method according to claim 4 wherein the reaction takes place in situ.

* * * * *

UNITED STATES PATENT AND TRADEMARK OFFICE
CERTIFICATE OF CORRECTION

PATENT NO. : 5,575,926

DATED : November 19, 1996

INVENTOR(S) : Deborah A. Haitko, Gerald R. Eykholt

It is certified that error appears in the above-indentified patent and that said Letters Patent is hereby corrected as shown below:

Title page item [75], add --Sunita Singh Baghel, Rensselaer, N.Y.--

Signed and Sealed this

First Day of April, 1997

*Attest:*

BRUCE LEHMAN

*Attesting Officer*  *Commissioner of Patents and Trademarks*